United States Patent [19]

Cousin et al.

[11] Patent Number: 4,695,338

[45] Date of Patent: Sep. 22, 1987

[54] INSULATING AND IMPERVIOUS ROOFING PANELS AND A PROCESS AND APPARATUS FOR THEIR MANUFACTURE

[75] Inventors: Stephane Cousin, Lamorlaye; Jean-Paul Boumendil, Paris, both of France

[73] Assignee: Isover Saint-Gobain, Courbevoie, France

[21] Appl. No.: 547,219

[22] Filed: Oct. 31, 1983

[30] Foreign Application Priority Data

Oct. 29, 1982 [FR] France ................................ 82 18166

[51] Int. Cl.⁴ .............................................. E04B 2/00
[52] U.S. Cl. ..................................... 156/71; 156/250; 156/289
[58] Field of Search ............... 428/280, 282, 284, 285, 428/287, 291, 489, 913; 156/71, 154, 155, 289, 250

[56] References Cited

U.S. PATENT DOCUMENTS 3,922,425  11/1975  Plumberg ............................. 156/71
4,259,127   3/1981  Schachter ........................... 428/282

Primary Examiner—James J. Bell
Attorney, Agent, or Firm—Oblon, Fisher, Spivak, McClelland & Maier

[57] ABSTRACT

. This invention relates to a fibrous panel and to a process and apparatus for its manufacture, the panel includes a dense felt mat (2) of mineral fibres having on at least one of its main surfaces an impervious covering (3, 7) consisting of a reinforcing layer (3) of mineral fibres impregnated with a binder, for example bitumen, and bonded to the felt (2) by the binder, and having, on the external surface, a sheet of separating agent (7) glued to the reinforcing layer (3) by the binder, the agent (7) being self welding in the heat. The panels according to this invention are advantageous for the insulation and weatherproofing of roofs, especially those with only a slight slope, in particular on account of their reliability in use as well as that of the impervious coverings for which they serve as support.

9 Claims, 2 Drawing Figures

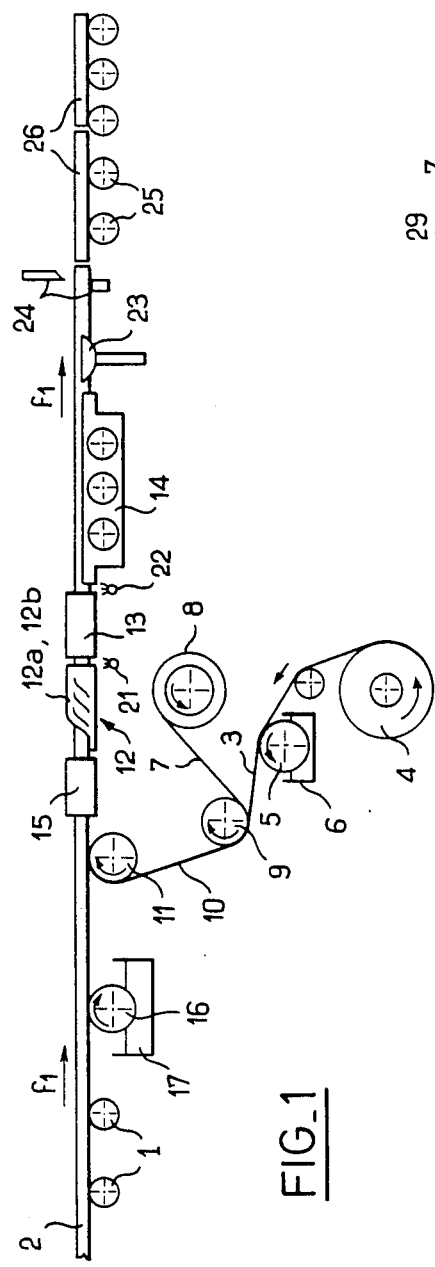
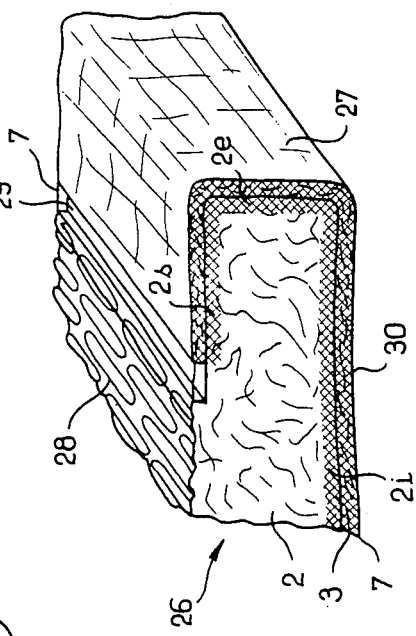
FIG_1
FIG_2

INSULATING AND IMPERVIOUS ROOFING PANELS AND A PROCESS AND APPARATUS FOR THEIR MANUFACTURE

BACKGROUND OF THE INVENTION

The present invention relates to panels consisting mainly of an insulating material such as a felt of fibres bonded together, one of the surfaces of each panel having a covering suitable in particular for receiving at least one layer of an impervious material which is resistant to weathering.

Panels of this type are already known, in particular for roofs having a slight slope, to serve both as insulating material and as support for impervious coverings, in particular of a bitumenous material.

Some known panels comprise a felt of mineral fibres bonded together having sufficient density to confer considerable rigidity on the panel while maintaining satisfactory insulating properties, and a covering consisting of a layer of glass fibres impregnated with bitumen and, on the external surface, a sheet of craft paper.

Such panels have, however, various disadvantages, such as the fact that the bond between the felt and the impervious coverings subsequently deposited on the panels after assembly lacks homogeneity due to the interposition of the sheet of craft paper and due to its sensitivity to moisture.

There has also been disclosed, in particular in U.S. Pat. No. 3,922,425 and French Pat. No. 2,025,428, a panel comprising a mineral fibre felt, one or more than one surface of which is impregnated with bitumen and covered with a thin skin of a separating agent such as a thermoplastic material which is capable of being eliminated, entirely or in part, by being torn off or by melting, combustion or dissolving in the molten bitumen used for the final impervious coverings. Such a thermoplastic material is preferably chosen from the group comprising polyethylenes and polypropylenes of low or medium density and is preferably used in the form of a sheet having a thickness of the order of 10 microns.

Such panels have, however, certain disadvantages relating both to the process proposed for their manufacture and to their properties, in particular those properties specifically conferred on them by the said process.

According to the Patents cited above, and more particularly to French Pat. No. 2,025,428, impregnation of the felt of mineral fibres is carried out by pouring a thin, continuous stream of molten bitumen over the felt from the slot of a coating apparatus. The penetration of bitumen is a function of various factors, in particular the quantity present per unit surface area, the fluidity of the product and hence also its temperature, the porosity of the felt, its own temperature, etc. Considerable heterogeneity therefore generally exists. Thus the surface layer, which is formed by a mixture of the usual type of insulating fibres and of chopped textile filaments, may be only partly impregnated or it may, on the contrary, represent only a small portion of the region of panel which has been impregnated. The finished product is therefore heterogeneous in its properties, in particular in its insulating properties, imperviousness, mechanical resistance, capacity to be bonded, etc.

Concerning the process proposed by said French Patent, it should be noted that it poses delicate problems in its execution as regards the precision of dosing, both in space and in time.

Such problems in fact arise even in the manufacture of the felt itself since in order to obtain a reinforced upper layer it is necessary to ensure homogeneous distribution of the chopped fibres introduced therein. Problems of dosing and distribution again arise subsequently at the stage of impregnation of the felt with bitumen, due to the numerous parameters which enter into this process, as mentioned above.

Furthermore, since bitumen is a very soiling product, its direct distribution over the rigid felt travelling underneath the coating slot does not enable the lateral surfaces of the felt to be correctly impregnated without risk of soiling the conveyor apparatus. All the more so is it impossible to envisage impregnating the lower edges by direct application of the process described.

SUMMARY OF THE INVENTION

The present invention proposes to overcome these various disadvantages.

It has as its object a fibrous panel for insulating and providing imperviousness, essentially comprising a mat consisting of a dense felt of mineral fibres joined together by a first binder finely dispersed in its substance, and, on at least one of its main surfaces, a covering consisting of a reinforcing layer of mineral fibres impregnated with a second binder and bonded to the felt by the second binder, the impregnated layer being in turn covered by a sheet of separating agent capable of being bonded to the reinforcing layer by the same second binder which impregnates the said reinforcing layer and capable of being self welding in the heat.

In a preferred embodiment, the second binder is a thermoplastic product, advantageously from the family of bitumens and, among these, preferably those having viscosity characteristics as a function of temperature within the following range: "ball and ring" temperature according to French standard T 66 008 within the range of 70° to 100° C. and preferably of the order of 85° C., and a penetrability according to French standard T 66 004 of the order of 25 (the unit of measurement being 0.1 mm).

It is also preferable if the reinforcing layer is formed by intermeshing glass fibres bonded together and it advantageously also contains a warp of reinforcing threads. The diameter of the fibres of the reinforcing film are advantageously e.g. from 6 to 20 $\mu$m and the threads of the warp may be continuous filament yarns of 60 to 80 composed of filaments with diameters from 70 to 20 $\mu$m. The mass per unit area of the film may advantageously be from 30 to 200 g/m$^2$ and is preferably of the order of 50 to 100 g/m$^2$ while the quantity of bitumen impregnating the film is from 1000 to 2000 g/m$^2$, preferably from 1300 to 1500 g/m$^2$.

The first binder, which provides the mechanical strength of the mat of mineral fibre felt, is advantageously of the phenol formaldehyde type, which is well known for such felts, although other substances, such as epoxy resins, urea resins, etc. may also be suitable, provided the second binder chosen is not incompatible with them.

The felt may consist of fibres of glass or rock wool and the binder will be hardened by heat after it has been compressed to such a density that it will still have very good insulating properties with a thermal conductivity, for example, of from 0.03 to 0.06 W/m° C. while its mechanical properties will have the high values required for the uses envisaged for these products. For example, a felt which, at a thickness of 30 mm, has a sag of the order of a few millimeters between two supports placed 1 meter apart and a resistance to punching of the order of 100 daN according to the CSTB punching test when freely spanned on a support having a valley width of 50 mm would be considered very satisfactory.

Such performances are normally obtained with felts having a mass per unit volume of from 120 to 250 kg/m$^3$ (preferably of the order of 150 kg/m$^3$).

Furthermore, to cover the most frequent uses, the thickness of the felt mat in the panel according to the invention should be from 2 to 15 cm.

In one preferred embodiment of this invention, the separating agent completing the external covering on at least one of the sheet of surfaces of the panel consists of a layer of a thermoplastic material which has good dimensional stability up to a temperature at least equal to the "ball and ring" temperature of the said second binder and is fusible at a temperature enabling the weather proofing products intended to form the final impervious layers to be poured over the panel according to the invention after the latter has been placed into its final position on a roof or terrace.

The separating agent is preferably chosen so that it will disappear under the action of heat or melt and dissolve in the product constituting the second binder or shrink or burn or decompose so that a close union will be formed between the bitumen impregnating the reinforcing film and the aforesaid final, impervious layers.

Advantageous products for constituting the said separating agent belong to the group of polyolefins and it is advantageous to chose polyethylenes and polypropylenes of low or medium density, preferably biorientated isotactic polypropylenes.

Polyester sheets 5 to 20 $\mu$m in thickness may also be suitable although their response to heat may be different.

These products are preferably used in the form of sheets or films advantageously having a thickness of from 5 to 20 $\mu$m, preferably of the order of 12.5 $\mu$m, but they may also be applied in the form of non-wovens or of projected powder.

According to the invention, the covering of the felt, comprising a reinforcing layer and a sheet of separating agent as described above, is applied not only to one of the main surfaces of the felt mat but preferably also to two opposite longitudinal surfaces and preferably also in addition to the undersurface over a considerable width, that is to say, for example, over a width of the same order as the thickness of the mat itself or in any case over a width of about 2 cm, and the sheet of separating agent should cover all the surfaces of the mat which have received bitumen.

When the surfaces of the mat are to be covered on the underside in this manner, they preferably have a recess devoid of material before the covering is applied. For this purpose, the material may be removed by grinding, for example, and the gap serves to prevent any excessive thickness of the finished panel at this level and to ensure firmer bonding of the reinforcing layer impregnated with bitumen.

The present invention also has as its object a process for the manufacture of the panel described above.

The process according to this invention for manufacturing a fibrous panel for insulation and imperviousness consists essentially of producing a dense mat of felt consisting of fibres bonded together by a first binder dispersed therein, stabilizing the mass per unit volume by setting of the binder, for example, by the passage of a hot gas through the felt, and then applying to at least one of the main surfaces of the felt a covering comprising a reinforcing layer impregnated by a second binder in a quantity and at a temperature sufficient to bond the reinforcing layer to the felt and a sheet of seperating agent which is capable of adhering to the reinforcing layer by means of the second binder and is self hot welding.

When the process is carried out continuously, the felt moves as a continuous band on a conveyor and after the treatment of stabilizing the mass per unit volume by hardening of the binder, the edges of the band are cut and machined to impart the required profile to the band and especially the required width, and the composite covering comprising the reinforcing layer previously impregnated with the second binder and then joined to the sheet of separating agent is then brought into contact with one of the main surfaces of the felt.

The process is advantageously carried out in such a manner that the aforesaid covering is applied to the lower surface rather than to the upper surface of the continuous band of felt, particularly if the separating agent consists of a sheet of thermoplastic material. As will be readily understood from the practical example of the process according to the invention which will be described in detail below, such a procedure enables the operator easily to control the impregnation of the reinforcing layer with bitumen and its subsequent application and bonding to the felt and at the same time the application to said reinforcing layer of the sheet of thermoplastic material which from that moment plays an important role as separating agent between the film impregnated with bitumen and the conveyor which may thereby be kept completely clean.

It is sufficient for this purpose to use a separating sheet in the form of a band at least equal and preferably slightly greater in width than the band of film impregnated with bitumen.

If the panel is to be manufactured with a "border" or with a "double border", that is to say if the composite covering comprising the film impregnated with bitumen and the separating sheet is to cover not only the main surface but also the two lateral surfaces and possibly even, in addition, a certain width along the edges of the second main surface, then the bands of reinforcing layer and separating sheet must be sufficiently wide to cover the said surfaces of the felt mat, and they may be applied to these surfaces by any suitable means such as guides or deflecting rollers.

After application of the covering to the band of felt, the band continues on its course on the conveyor and at the same time exerts a certain pressure on the said covering, either by its own weight or possibly with the aid of pressure rollers, until the covering is sufficiently hardened to enable the covered band to be cut transversely, for example by means of saws, to produce easily handled panels.

The panels thus obtained, and particularly panels which have a "border" or, better still, a "double border" are particularly suitable for insulating roofs and rendering the impervious. They have excellent resistance to peeling, that is to say to the tearing off of the covering, a property which is desirable for counteracting the effect of wind on the site where the roofing is employed. The panels also respond equally favorably to other tests carried out to compare their suitability in use with that of other products produced for the resistance same purpose, such as tests to determine the resist to bending, to punching (static of dynamic), to wear, friction and compression, etc.

The panels according to the invention are preferably placed edge to edge with staggered joints, the covered lateral surfaces being flame heated in the case of panels with borders or double borders before the said covered lateral surfaces are brought into contact and bonded together. The panels are then mechanically fixed to their support, such as a corrugated steel structure, concrete elements or some other material, by mechanical means such as self drilling screws, headed or headless rivets, soldered dowel pins, etc, preferably with interposition of washers.

The impervious coverings subsequently to be applied to such an assembly of panels advantageously consist of sheets of reinforced bitumen or similar products which may be flame welded to the panels if the bitumen of said products is chosen to be compatible with the materials directly covering the panels, that is to say with the bitumen impregnating the reinforcing layer and with the separating sheet, and in this operation, the separating sheet should melt, shrink, burn and/or dissolve in one or other of the two bituminous materials present so that the two materials may be intimately bonded together.

The external surface of such impervious coverings applied to an assembly of panels according to this invention is not significantly affected by variations in climatic conditions and in particular the ambient temperature. In particular it does not show any signs of curvature which tends to appear on panels having craft paper as separating agent.

These ideas may be illustrated with reference to a typical insulating and impervious structure for a roof with a slight slope, which may consist, starting from a slab of concrete, for example, of the following layers:

a coating based on oxidized bitumen applied hot;

a bituminous felt having a thickness of the order of 2 mm consisting of a film of mineral fibres impregnated with bitumen in an amount of about 36 kg of bitumen per 20 m$^2$ and having a scattering of sand grains on both sides;

another coating layer applied hot, such as the first one mentioned;

a panel according to the invention;

one or two impervious membranes of bituminous substance or a composite bitumen-elastomer or bitumen-polymer substance.

BRIEF DESCRIPTION OF THE DRAWINGS

Further advantages and characteristics of the present invention will be apparent from the detailed description given below with reference to the attached drawings, in which FIG. 1 is a schematic elevational view of a production line for panels according to the invention and FIG. 2 is a sectional view in perspective of an edge of a panel according to the invention.

DETAILED DESCRIPTION OF THE PREFERRED EMBODIMENTS

The apparatus shown in FIG. 1 comprises a conveyor with rollers 1 driving the band of felt 2 in the direction of the arrows $f_1$. The reinforcing layer 3 delivered from a spool 4 optionally equipped with a tension regulating device is driven towards an impregnating drum 5 the lower part of which is immersed in a vat 6 containing the bitumen used as second binder in the molten state. This vat is equipped with a heating device with temperature control. A sheet 7, for example of polypropylene, delivered from the spool 8 is brought into contact with the impregnated reinforcing layer 3 and is interposed between the said reinforcing layer and the drum 9, and the composite covering 10 thus obtained is in turn interposed between the felt band 2 and the drum 11.

A table 12 equipped with deflector-shapers 12a, 12b placed on either side of the felt band downstream of the drum 11 serves to apply the edges of the composite band 10 against the lateral surfaces and possibly also the upper surface of the felt 2.

It is also advantageous according to this invention to equip the production line with cooling means 13, 14, just behind the deflector-shapers 12a, 12b to assist hardening of the bitumen and dimensional stabilization of the band of felt 2 carrying the composite covering 10. The means may consist, for example, as shown in FIG. 1, of one or more cooled stabilizing tables 13 and one or more cooled conveyors 14.

Upstream of the shaping table 12 and separating it from the drum 11 which brings the composite covering 10 into contact with the lower surface of the felt band 2, a table and/or box 15 for adjusting the temperature may advantageously be provided to regulate the transverse temperature gradient of the composite covering 10 in contact with the felt 2 and optionally covering its sides, and possibly also to regulate the temperature of the felt 2 at the level of the lateral surfaces and of the upper surface where the edges of the composite covering 10 are to be applied with the aid of the deflectors 12a, 12b.

According to the invention, it is also advantageous to arrange, upstream of the applicator drum 11, a device for coating the under surface of the felt band 2, the device comprising, for example, a drum 16 having its lower part immersed in a vat 17 containing molten bitumen. This product should be compatible with the bitumen used for impregnating the reinforcing layer 3 since it is intended to improve the adherence of the film 3 to the felt 2.

In addition to the cooling means 13, 14 mentioned above, there may also be provided rows of water spray jets 21, 22 represented, respectively, downstream of the table 12 and the table 13. Similar jets may also be arranged at the level of the chest or table 15 with a view to cooling, if necessary, the lower surface of the felt band 2 to which the composite covering 10 is to be applied, and similar jets may be provided in the chest containing the cooled conveyor 14.

Means for controlling the temperature of the drums 9 and 11, optionally supplemented by additional water spray jets (not shown) of the type mentioned above and arranged in the space between the drums and opposite the surface of the composite band 10 comprising the polyolefin sheet 7 are also advantageously provided for controlling the temperature of the sheet 7 and that of the superficial part of the bituminous film 3 with which it is in contact. The dimensional stability and main properties of the sheet 7 are thereby ensured.

When such means for cooling by water spraying are provided, it is advantageous to provide drying means 23, such as a box supplied with dry air at a suitable temperature, downstream of the cooling means.

The apparatus according to the invention also comprises means such as a guillotine 24 for cutting up the covered band into individual panels. The frequency of movement of the guillotine 24 determines the second or length dimension of the panel as a function of the speed of forward movement of the band or felt, the first dimension being the width of the band of felt.

A conveyor 25 discharges the cut panels 26 to an apparatus for packaging and storage.

A panel 26 manufactured as described above is illustrated in FIG. 2 which is a sectional, perspective view of an edge of such a panel, showing a lateral surface 27 and the surface 28 situated at the top of the band of felt when the process according to the invention described above is carried out. This surface has been rectified by grinding on its two edges to form a very flat surface 29 enabling the composite covering 10 to make very close contact with the felt 2 and preventing any excess thickness of the covering 10 projecting above the pre-existing relief of the surface 28, an example of which relief is given in FIG. 2. The impregnation of the felt 2 by bitumen is represented by a superficial, shaded zone which is substantially thicker at $2_i$, situated on the lower surface 30 when the impregnating drum 16 is used, than in the region $2_e$ at the lateral surface 27 or in the region $2_s$ close to the rectified surface 29, these being regions in which the bitumen is derived mainly from the impregnated reinforcing layer 3 in contact with the felt 2.

The sheet of polyethylene 7 constituting the separating agent extends beyond the band of impregnated reinforcing layer 3 which is applied to the rectified surface 29, for example so as to reach as far as the unrectified surface 28, as shown in FIG. 2.

The main characteristics of the panels according to the invention are given by way of indication in the annexed Table and comprise:

a felt of rock wool impregnated with phenol formaldehyde resins having a high density of the order of 150 kg/m$^3$, and a composite covering comprising 50 g/m$^2$ of a glass film impregnated with 85/25 or 100/40 oxidized bitumen (ball and ring temperature) and a thermoplastic polypropylene film (melting temperature of the order of 200° C.).

Particular attention will be drawn to the performance in the peeling test for imperviousness, which demonstrates the advantage of the composite covering with "border" on the panels according to the invention (force necessary for peeling: 90 daN/m) compared with the performances obtained in the same test carried out on panels covered with the same composite covering on only one surface (50 daN/m) and bare felt panels (30 daN/m). This test represents real conditions under which the covering panels are used. It determines the effort required to tear off, by peeling from one of the edges, an impervious covering of reinforced bitumen previously flame welded to the panel to be tested.

Furthermore, the border on the panels manufactured according to the invention, which enables adjacent panels to be welded edge to edge when placed into position by softening or "reactivating" the bitumen of the composite reinforcing covering by means of a flame, confers excellent mechanical endurance on the joints between the panels and consequently ensures homogeneous distribution of the stresses imposed on the roofing manufactured with the aid of the panels according to the invention.

According to one additional feature of this invention, any sides which have not been covered may subsequently be covered by strips of the covering previously prepared for the purpose and applied by heat, and these strips may, for example, cover surfaces equivalent to those covered by the "border" formed on the other sides in the production line.

The distribution of stresses mentioned above may thus be even further improved and the difficulties resulting from rain while working on the site will be substantially diminished since the imperviousness may be obtained right round each panel if the heat fusible separating film has been melted and eliminated in the course of flame welding.

In order to ensure complete tightness of the panel, the invention also provides for the application of a composite coating to the second main surface of panels which have been provided with borders, and to the two longitudinal surfaces which have not been covered during the initial operation, so that finally all six sides of the panel will be covered.

In addition to the tests, the results of which are shown in the annexed table, other tests were carried out to demonstrate the advantages of the panels according to the invention over panels of the prior art as regards their convenience and reliability in use.

These advantages are particularly shown by the friction and compression test (Lisson machine simulating foot traffic) and the static punching test.

| MAIN CHARACTERISTICS OF THE PANELS ACCORDING TO THE INVENTION (Thickness 30 mm) | | |
|---|---|---|
| Characteristics | Unit | Mean |
| effective thermal conductivity | W/m °C. | 0.041 |
| fire resistance classification (calorific value) | kcal/kg | 600 |
| sagging in response to a strain of 0.2 daN/cm$^2$ | mm | 2 |
| deferred compression | | |
| under 400 kg/m$^2$ | mm | 0.5 |
| under 1000 kg/m$^2$ | mm | 1 |
| perpendicularly to the faces | daN/cm$^2$ | 0.15 |
| absorption of water after immersion for 24 hours | % | Approx 7 |
| dimensional variations: | | |
| as a function of temperature | mm | approx 0 |
| as a function of humidity | mm | approx 0 |
| peeling of impervious skin | daN/m | 90 |
| rupture strain by punching in unsupported part of vat: | | |
| groove of 50 mm | daN | 110 |
| groove of 70 mm (punching 20 × 80 mm) | daN | 100 |

We claim:

1. A process for the manufacture of a heat insulating and liquid impervious fibrous panel which may be covered with at least one hot applied bituminous coating, said process comprising the steps of:
   forming a dense mat of felt consisting of mineral fibres bonded together by a first thermosetting binder finely dispersed therein,
   stabilizing the mass per unit volume of said mat by a heat treatment to set said binder, and
   applying to at least one main surface of said mat a pliant composite covering comprising together a fiberous reinforcing layer impregnated with a heat softened binder and a sheet of pliant separating agent, said composite covering being applied with the reinforcing layer in contact with said mat and in a quantity of said heat softened binder and at a temperature sufficient to ensure adherence of said reinforcing layer to said felt mat and said separating agent being selected so as to be capable of being bonded to said reinforcing layer by means of said second binder and capable of hot self-welding to the reinforcing layer.

2. Process according to claim 1 comprising the steps of:
cutting and machining edges of said mat to impart a required profile and width thereto,
continuously supplying said cut and machined mat, after said stabilizing step, in the form of a mat band onto elements of a moving conveyor,
hot impregnating a band of said reinforcing layer unwound from a first spool with said second binder,
joining said separating agent to a surface of said reinforcing layer;
bringing at least one main surface of said mat into contact with another surface of said reinforcing layer, whereby said at least one main surface of said mat is covered by said composite covering,
cooling said covered mat band to permit said second binder to harden, and cutting said covered mat band into panel units.

3. Process according to claim 2, wherein said at least one main surface of the mat band to which the composite covering is applied is a lower main surface in contact with the conveyor, said process including the step of impregnating said lower main surface with a binder compatible with said second binder before contacting said lower main surface with said impregnated reinforcing layer of said composite covering.

4. Process according to claim 3, wherein the sheet of separating agent is unwound from a second spool and is applied to the reinforcing layer after impregnation of said reinforcing layer by the second binder, and wherein said composite covering is subjected to controlled cooling before said impregnated reinforcing layer comes into contact with the mat band and said elements of the conveyor driving said mat band.

5. Process according to claim 4, wherein the sheet of separating agent is wider than the band of impregnated reinforcing layer.

6. Process according to claim 5, wherein the band of impregnated reinforcing layer is sufficiently wider than the mat band so as to be able to overlap lateral surfaces of the mat band, and wherein the composite covering is applied to said lateral surfaces and to a second main surface of the mat band by means of deflectors pressing said composite covering agents surfaces on lateral parts of said second main surface.

7. Process according to one of the claims 3, 5, 6 or 2 including the step of regulating the temperature of each of the surfaces of the reinforcing layer after the impregnation of the reinforcing layer by the second binder and before the impregnated reinforcing layer is brought into contact with, respectively, the sheet of separating agent and the mat band, whereby the dimensional stability of said sheet of separating agent is preserved and adherence of said sheet of separating agent to said reinforcing film is ensured so as to bring about intimate adherence of said impregnated reinforcing layer to said mat band with transfer to part of the second binder carried by said reinforcing layer to said mat band.

8. Process according to one of the claims 3–6 or 2, wherein the temperature of the mat band carrying the composite covering is controlled to bring about stabilization of dimensions thereof by hardening of the impregnating bitumen.

9. Process according to one of the claims 3–6 or 2, wherein when the reinforcing layer and sheet of separating agent are brought into contact to form the composite covering, the sheet of separating agent is cooled by at least one of contact with a cooled support and the projection of a gas or liquid fluid, so as to preserve the dimensional stability and integrity of said sheet of separating agent.

* * * * *

UNITED STATES PATENT AND TRADEMARK OFFICE
CERTIFICATE OF CORRECTION

PATENT NO. : 4,695,338

DATED : September 22, 1987

INVENTOR(S) : Cousin et al

It is certified that error appears in the above-identified patent and that said Letters Patent is hereby corrected as shown below:

In column 1, line 17, delete "bitumenous" and insert therefor --bituminous--;

In column 2, line 14, change "so is it" to --so it is--;

In column 2, line 21, delete "essentually" and insert therefor --essentially--;

In column 2, line 48, delete "60 to 80" and insert therefor --60 to 80/Te--;

In column 4, line 6, delete "seperating" and insert therefor --separating--;

In column 4, line 68, delete "for the resistance same purpose" and insert therefor --for the same purpose--;

In column 5, line 1, delete "resist" and insert therefor --resistance--;

In column 6, lines 28-30, delete "felt 2" and insert therefor --felt band 2--;

UNITED STATES PATENT AND TRADEMARK OFFICE
CERTIFICATE OF CORRECTION

PATENT NO. : 4,695,338

DATED : September 22, 1987

INVENTOR(S) : Cousin et al

It is certified that error appears in the above-identified patent and that said Letters Patent is hereby corrected as shown below:

In column 6, lines 40 & 41, delete "film 3" and insert therefor --reinforcing layer 3--;

In column 7, line 2, delete "or felt" and insert therefor --of felt--;

In column 8, line 40, delete "perpendicularly" and insert therefor --perpendicular--;

In column 8, line 67, delete "fiberous" and insert therefor --fibrous--;

In column 9, line 21, after "layer" delete ";" and insert therefor --,--;

Signed and Sealed this

Twelfth Day of July, 1988

Attest:

DONALD J. QUIGG

Attesting Officer

Commissioner of Patents and Trademarks